June 8, 1937.  E. HEITMAN  2,083,378
REFRIGERATING APPARATUS
Filed Aug. 17, 1933  4 Sheets-Sheet 1
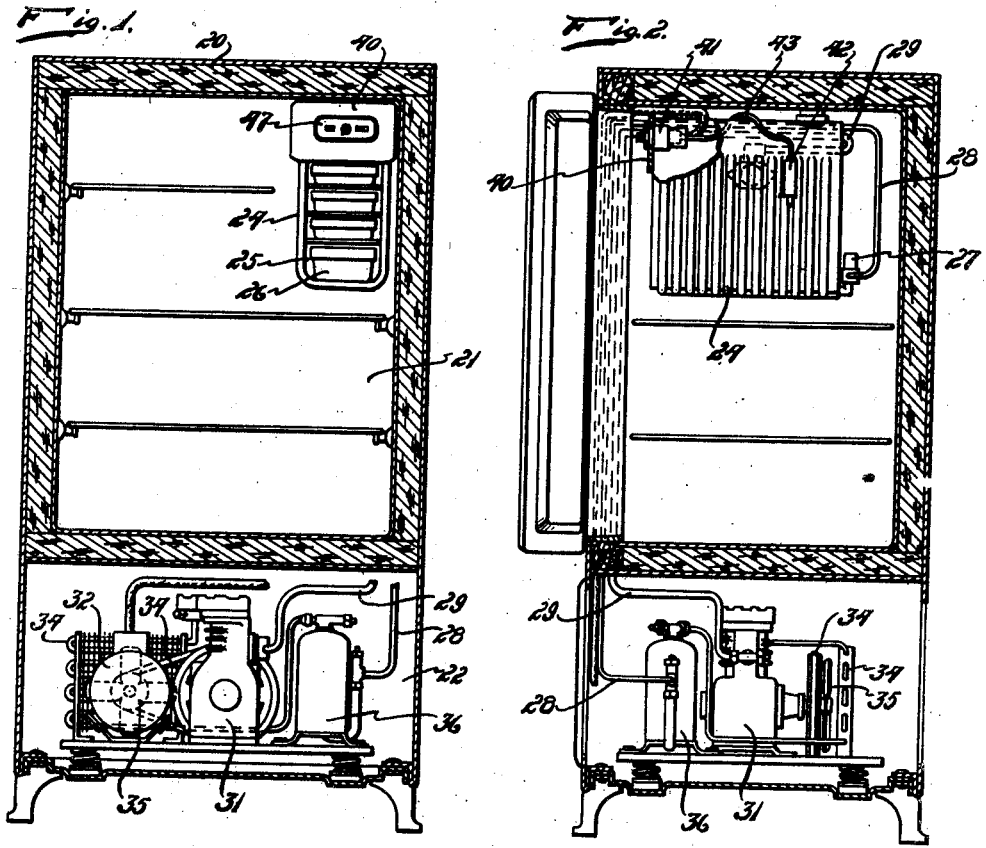
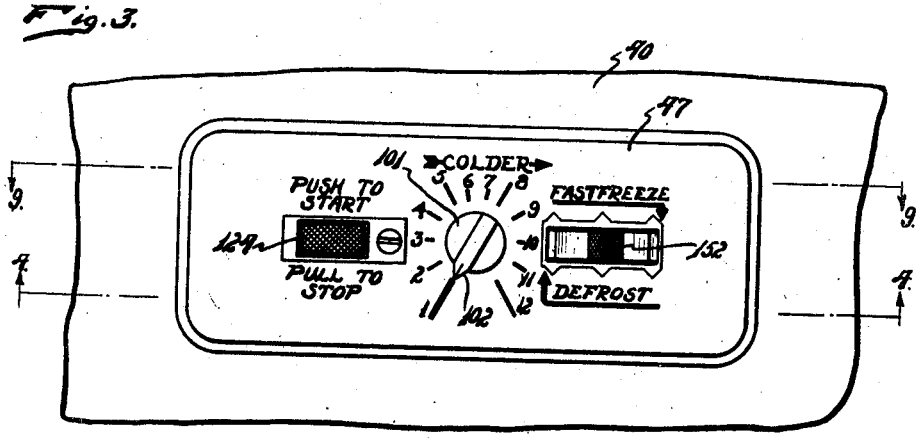
INVENTOR.
EDWARD HEITMAN
BY
Warren H. J. Schmidt
ATTORNEY.

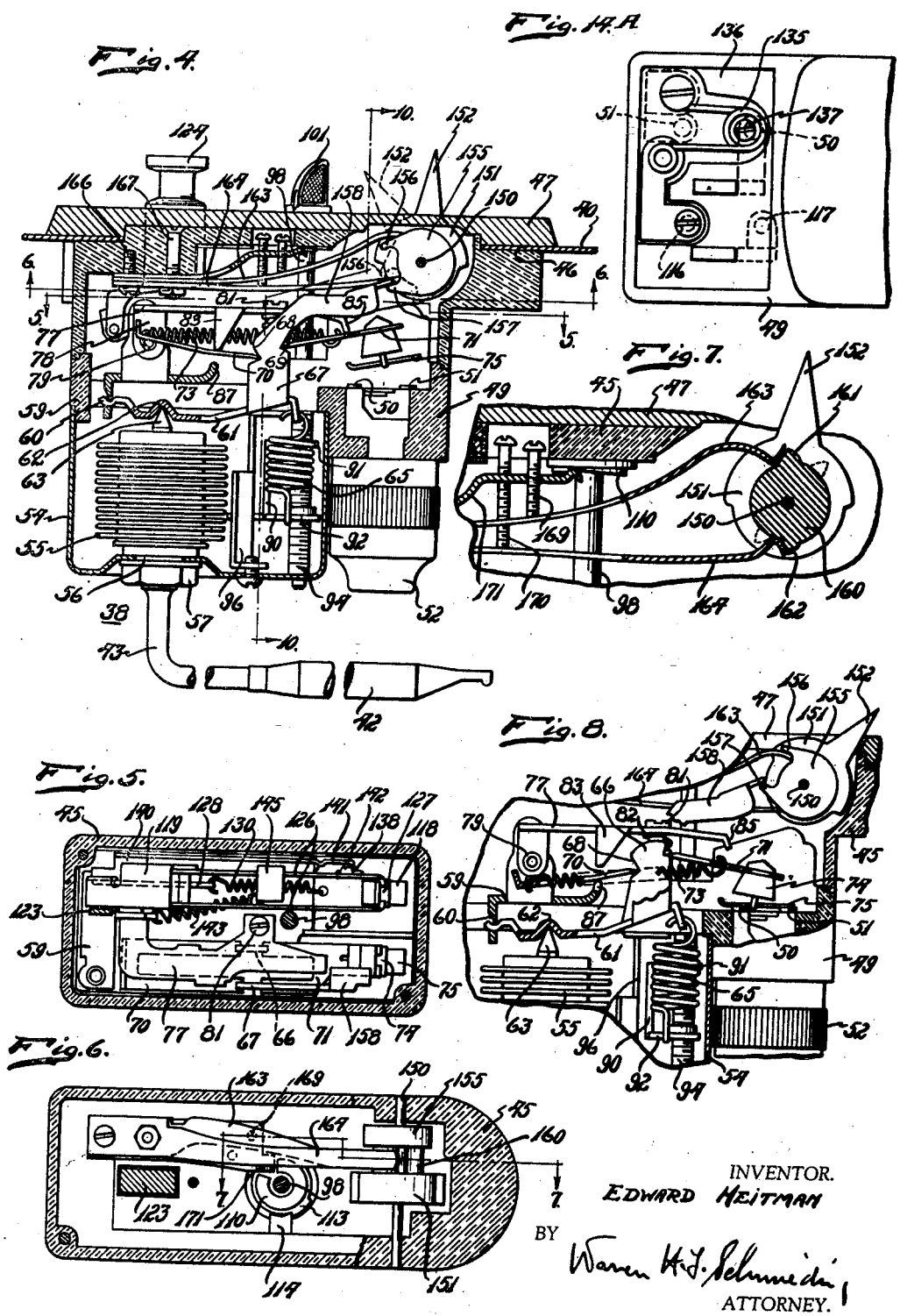

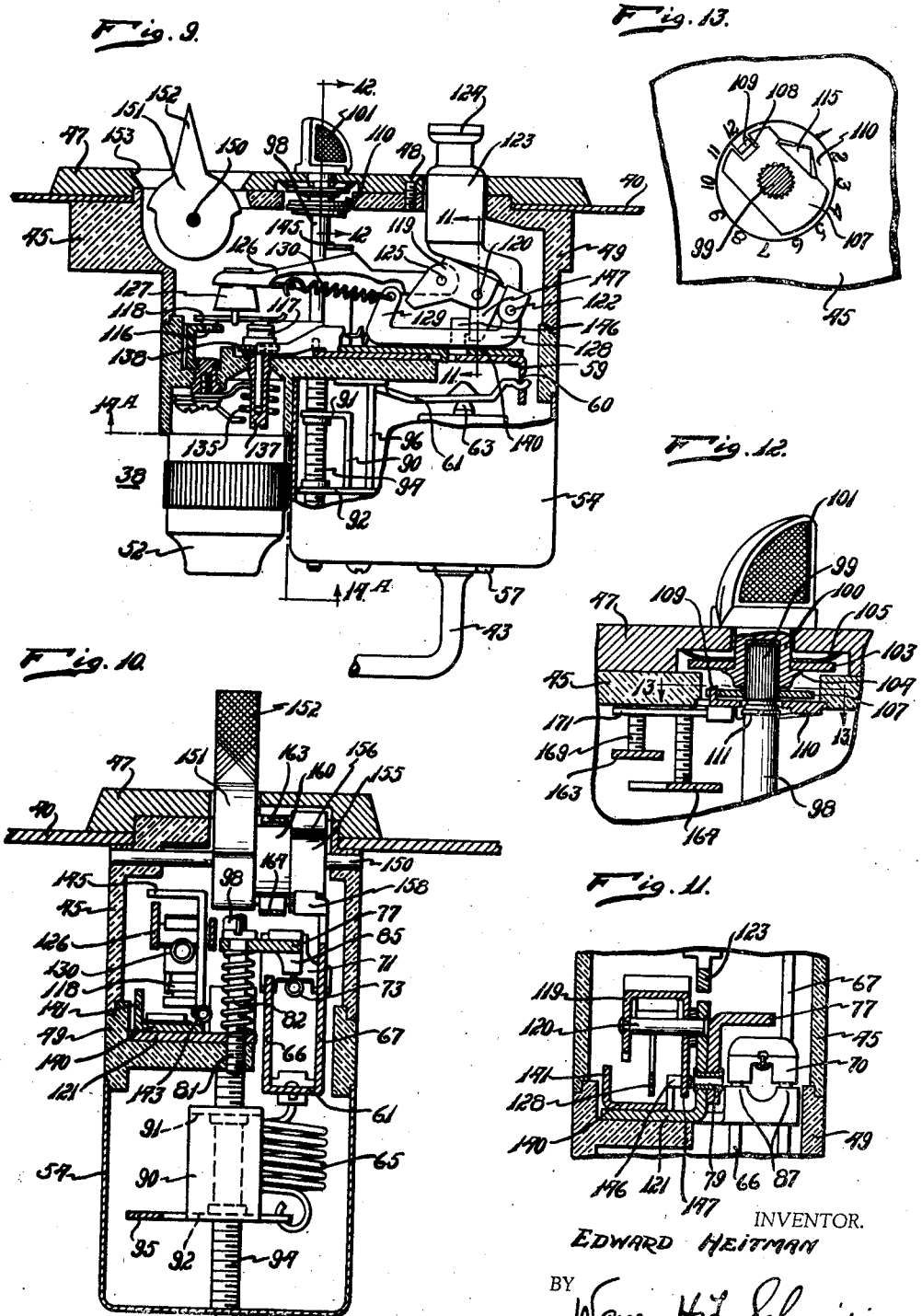

June 8, 1937.  E. HEITMAN  2,083,378
REFRIGERATING APPARATUS
Filed Aug. 17, 1933  4 Sheets-Sheet 4
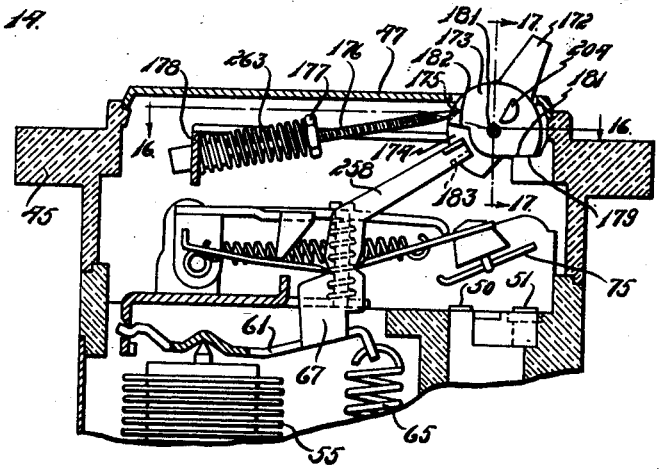
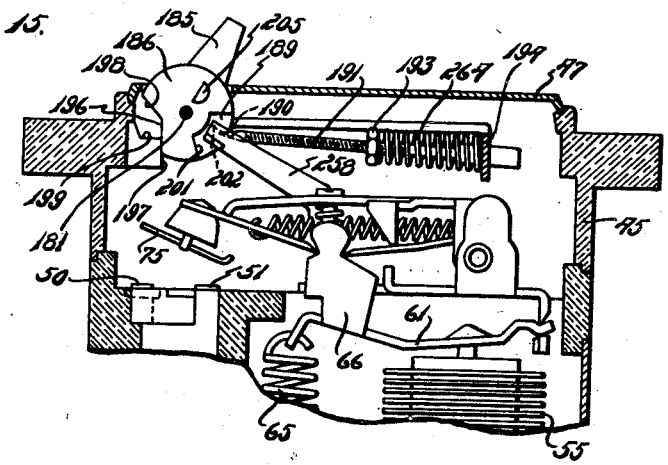
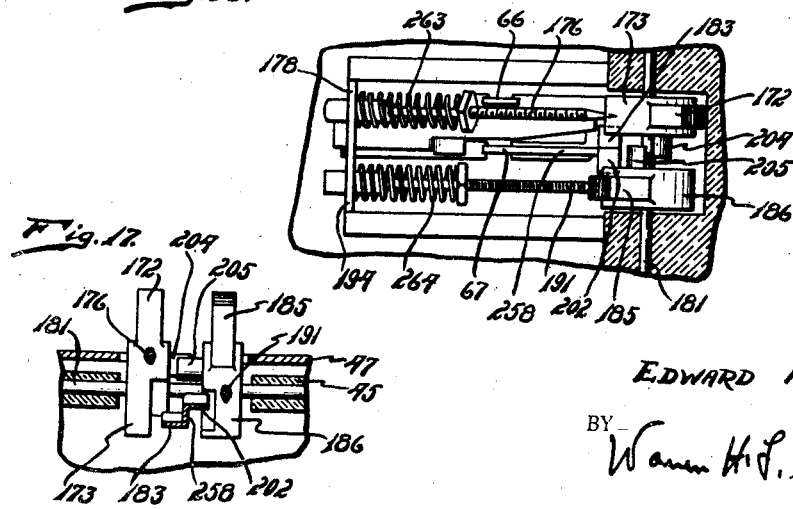
INVENTOR.
EDWARD HEITMAN
BY
ATTORNEY.

Patented June 8, 1937

2,083,378

UNITED STATES PATENT OFFICE 2,083,378

REFRIGERATING APPARATUS

Edward Heitman, Detroit, Mich., assignor to Kelvinator Corporation, Detroit, Mich., a corporation of Michigan Application August 17, 1933, Serial No. 685,531

5 Claims. (Cl. 200—83)

The present invention relates to refrigerating systems and particularly to the control of the temperature of the cooling element of the refrigerating system.

Normally the cooling element of a refrigerating system, particularly the household type is maintained between predetermined temperature limits, providing a mean temperature which is desirable for proper food preservation. Usually a freezing compartment is provided for congealing desserts such as ice cream, sherbets and the like or for freezing water, and, at the temperature normally maintained, the ice cream or the like or water will freeze over a period of time. It is often desirable to hasten the freezing. At this temperature, at least a portion of the cooling element of the refrigerating system must be maintained at a temperature lower than 32° F. and therefore moisture collects on the cooling element and freezes thereon in the form of a frost. In the course of time, this frost builds to such a thickness as to materially impair the efficient operation of the refrigerating system. It is an object of the present invention to provide a refrigerating system and a control mechanism therefore which can be manipulated for obtaining either a higher or lower than normal temperature of the cooling element or cooling unit and which mechanism is arranged to restore the cooling element to its normal temperature after a temporary phase of operation of the system has taken place.

Other and further objects and advantages will be apparent from the following disclosure, reference being had to the accompanying drawings wherein preferred forms of embodiment of the present invention are clearly shown.

In the drawings:

Fig. 1 is a longitudinal cross sectional view of the household type refrigerating cabinet showing a refrigerating system disposed therein;

Fig. 2 is a longitudinal cross sectional view of the refrigerating cabinet with the refrigerating mechanism therein, the section being taken substantially at right angles to that of Fig. 1;

Fig. 3 is a front view of the control panel;

Fig. 4 is a sectional view of a controller of the system;

Figs. 5 and 6 are sectional views taken on lines 5—5 and 6—6 respectively of Fig. 4;

Fig. 7 is a sectional view taken on line 7—7 of Fig. 6;

Fig. 8 is a fragmentary sectional view showing part of the mechanism shown in Fig. 4 but showing the same in a different position;

Fig. 9 is another sectional view of the controller;

Fig. 10 is a sectional view taken on line 10—10 of Fig. 4;

Fig. 11 is a sectional view taken on line 11—11 of Fig. 9;

Fig. 12 is a sectional view taken on line 12—12 of Fig. 9 but on a somewhat larger scale;

Fig. 13 is a sectional view taken on line 13—13 of Fig. 12;

Fig. 14A is a fragmentary bottom view taken on line 14A—14A of Fig. 9 with the electrical plug removed;

Fig. 14 is a fragmentary sectional view of a modified form of the invention;

Fig. 15 is a sectional view of the modified form shown in Fig. 14 looking in the opposite direction, the section being taken through another portion of the controller;

Fig. 16 is a sectional view taken on line 16—16 of Fig. 14 and

Fig. 17 is a sectional view taken on line 17—17 of Fig. 14.

Referring first to Figs. 1 and 2, for the purpose of illustrating the present invention, there is shown a refrigerating cabinet 20 of the household type having insulated food compartment 21 and a machine compartment 22. The cooling element or unit is herein shown as an evaporator 24 forming a freezing compartment 25 containing trays 26. The flow of liquid refrigerant to the evaporator 24 is controlled by an expansion valve 27 of any suitable type, the liquid refrigerant being conducted thereto by a liquid line 28. Gaseous refrigerant is withdrawn from the evaporator 24 through a pipe 29. Disposed within the machine compartment 22 is a compressor 31 which is driven by a motor 32 by a belt 33. Gaseous refrigerant from the pipe 29 is conducted to the low pressure side of the compressor 31, is compressed by the compressor 31 and forced into a condenser 34. The condenser is placed so as to be cooled by a fan 35 driven by the motor 32. The compressed refrigerant is condensed within the condenser and liquefied and then passed into a receiver 36 from whence it is conducted to the expansion valve 27 through the pipe 28. During normal operation of the system the compressor 31 circulates such amount of refrigerant through the evaporator 24 so as to maintain the air within the cabinet 20 at a temperature desirable for proper food preservation and in the present illustration the flow of refrigerant is controlled by starting and stopping the compressor 31, the compressor being started when a predetermined maximum high temperature is reached and stopped when a predetermined minimum low temperature is reached. For economic purposes, at this temperature the water or sherbet or the like which may be contained within the trays 26 will freeze relatively slowly. At times it is desirable to hasten this freezing. When operating at normal temperatures, moisture from the food and moistures which enter the box or the cabinet when the door is open, condenses on the evaporator and freezes thereon. In the course of time this frost will become so thick as to impair refrigeration.

In accordance with the present invention there is provided a controller 38 for the system which normally maintains the evaporator between predetermined high and low temperature limits and which mechanism may be manually set to obtain temporarily a low temperature of the evaporator. After this temporary phase of operation has taken place, the controller functions to automatically restore the system to the normal control. The controller also includes means for manually adjusting the same to temporarily obtain a high temperature of the evaporator and after this predetermined temporary phase of operation, the system is restored to the normal control. This controller is preferably carried on the front of the evaporator by a plate 40 and comprises a switch 41, a thermostatic bulb 42 which is connected to the switch by a tube 43. The switch comprises a main frame 45 formed of material such as "bakelite" which is undercut as at 46 and has a portion which extends through an opening 40 in the panel. The switch is secured to the panel 40 by clamping the panel 40 between the frame 45 and an indicia plate 47 by a screw 48. A second frame 49 which may be also "bakelite" is secured to the frame 45. Frame 49 carries contacts 50 and 51 which are spaced from one another and are suitably connected with a socket 52. The switch also comprises a cup shaped casing 54 in which there is disposed a metallic bellows 55 which is connected with the thermostatic tube 43. The bellows 55 is provided with an externally threaded fitting which extends through an opening 56 in cup 54 and the bellows is clamped to the cup by a nut 57 which is threaded on the fitting.

A bracket 59 is secured to the frame 49 and forms a knife edge fulcrum 60 for a lever 61. Lever 61 is conically depressed as at 62 to form a socket for receiving the point 63 on the top of the bellows 55. A volatile fluid is contained within the thermostat 42, tube 43 and bellows 55 and is therefore responsive to changes in temperature for causing expansion and contraction of the bellows 55. When the temperature at bulb 42 increases, bellows 55 will expand causing upward movement of the point 63 and consequently lever 61. Lever 61 is normally urged downwardly by a coil spring 65. Two ears 66 and 67 extend from opposite sides of the lever 61 and are bent upwardly and each of these ears is notched as at 68 and 69 to receive knife edges of levers 70 and 71 respectively. The ends of levers 70 and 71 are bifurcated so that each is provided with two knife edges. Levers 70 and 71 extend laterally from opposite sides of the ears 66 and 67 and are interconnected by a coil spring 73 which normally tends to pull the outer ends of the levers 70 and 71 toward one another. A block of insulating material 74 is carried by lever 71 and this block in turn loosely carries a contact 75 which is arranged to bridge contacts 50 and 51. When the ears 66 and 67 are in the position shown in Fig. 4, spring 73 holds the levers 70 and 71 in a position in which contact 75 does not bridge contacts 50 and 51 but when these ears are in the position shown in Fig. 8, spring 73 holds the levers 70 and 71 in a position whereby the contact 75 bridges contacts 50 and 51.

Bracket 59 also pivotally carries a lever 77. This lever 77 includes depending ears 78 which are fulcrumed at pivot 79 to bracket 59. A screw 81 extends freely through the lever 77 and the head thereof forms an abutment for lever 73, the lever 77 being forced upwardly against the underside of the head by a coil spring 82. Depending from opposite sides of a lever 77 are ears 83 which form fulcrum points for the lever 70 and the outer end of lever 77 includes a downwardly extending finger 85 which forms a stop for limiting the upward movement of lever 71. As the pressure within the bellows increases, the lever 61 and ears 66 and 67 will be moved upwardly causing the inner ends of levers 70 and 71 to be moved upwardly. These levers 70 and 71 will fulcrum about the ears 83 and finger 85 causing the outer ends of the levers to move downwardly and after these levers are moved beyond the dead center position with respect to one another, the coil spring 73 will pull the outer ends of the levers downwardly to the position shown in Fig. 8. Current will now flow through the motor 32 to drive the compressor 31 and gradually reduces the temperature in the evaporator 24. The thermostat bulb 42 is in intimate thermal contact with the evaporator and is therefore responsive to the temperature thereof. As the temperature within the evaporator decreases, the temperature of the volatile fluid in the bulb 42 will decrease causing a reduction of pressure within the bellows 55 and a gradual contraction thereof. The spring 65 urges the lever 61 downwardly and when the pressure within the bellows decreases, the lever 61 will move downwardly. Substantially directly underneath the ears 83 are fingers 87. These fingers are formed integrally with the bracket 59 and provide lower fulcrums for the lever 70. As the ears 66 and 67 are moved downwardly, the inner ends of the levers 70 and 71 will also be moved downwardly causing the lever 70 to fulcrum about fingers 87 and also cause the outer ends of the levers 70 and 71 to move upwardly. When the ears move downwardly to such an extent that the levers 70 and 71 move beyond their dead center position, with respect to one another, the spring 73 will cause the outer ends of the levers to move upwardly quickly to thereby separate contact 75 from contacts 50 and 51. By turning the screw 81 downwardly, the lever 77 will be moved to a lower position so that the levers 70 and 71, when in their uppermost positions, are closer to their dead center positions because of the lowering of the fulcrum points of lever 70 formed by the ears 83. In this manner the range between the high and low temperature operation of the switch is reduced and thus the degrees of temperature between the cut in and cut out of the motor can be regulated.

The mean temperature of the evaporator is controlled by adjusting the tension of the spring 65. The spring 65 is connected at its lower end to a vertically moving bracket 90. The two upper and lower horizontal extensions 91 and 92 are threaded to receive a screw 94. The bracket 90 includes an extension 95 which slidably engages a stationary bracket 96 for guiding the bracket 90. The bracket 96 is secured to the frame 49. The shank 98 of the screw 94 extends through the frame 46 and has its outer end deeply grooved as at 99. An externally grooved bushing 100 is longitudinally slidable on the grooved end 99 and shank 98 and is adapted when rotated to rotate the shank 98. Bushing 100 extends through the indicia plate 47 and is secured to a knob 101. Knob 101 forms a pointer 102 which is arranged to register with the indicia formed on the plate 47. A disk 103 is carried on a shoulder 104 of the bushing 100 and a saucer type disk 105 formed of flexible material and having the ends thereof serrated and disposed between disks 103 and the bottom of plate 47 for the purpose of frictionally restraining turning of the knob 101 and shank 98. The knob 101 can however be turned at will and by turning the knob and consequently shank 98 the bracket 90 is raised or lowered in order to decrease or increase the tension of the spring 65. If a colder temperature is desired in the cooling unit, the knob is moved from the No. 1 position in a clockwise direction and this causes a raising of the bracket 90 and consequently a decrease in the tension of the spring 65 which has the effect of decreasing its resistance to the upward movement of the bellows 55 whereby the switch will operate to close the motor circuit at a lower pressure in bellows 55 and bulb 42. Consequently the motor will be started when the evaporator 24 is at a relatively lower temperature. In this manner the evaporator will operate between lower limits of temperature.

Referring to Figs. 12 and 13, it is to be seen that a plate 107 having grooves is geared to the grooved end 99. This plate 107 is cut out at 108 so as to receive an upward extension 109 of a cam 110. This cam 110 is rotatably mounted on the shaft 98 and is held in position by a split washer 111. Cam 110 at one side thereof is provided with a projection 113 which is arranged to engage either side of a stop 114 formed in the frame 45 (see Fig. 6). By turning the knob 101, the plate 107 and cam 110 are rotated, the cam 110 being rotated by the engagement of the plate 107 with the upstanding extension 109. However the range of movement of the knob 101 is limited to less than 360°, namely from the point No. 1 to the point No. 12 (see Fig. 3) by reason of the fact that the projection 113 will engage opposite sides of the stop 114. In this manner the range of movement by which the housewife can adjust the tension of the spring 65 is limited so that it is impossible for her to change the adjustment to such a degree as to cause inefficient operation of the refrigerating apparatus. When assembling the switch, the tension of the spring 65 is adjusted by turning the end 99 directly before the plate 47, bushing 100 and knob 101 are applied. The tension of the spring is adjusted so as to give normal operation of the refrigerating apparatus when the knob 100 is in its No. 1 position. The cam 110 is then placed in position and the plate 107 is next assembled. This plate 107 is provided with a pointer 115 and indicia numbers 1 to 12 are provided on the top of frame 45. Then the cam 110 is placed in a position in which the pointer 115 registers with No. 1 on the frame 45. Then the plate 107 is placed in position and since it is geared to the grooved end 99, it must be properly placed over the end of the grooved end 99 so that its cut out portion 108 registers with the extension 109 on cam 110. The bushing 100 disks 103 and 105 are next assembled and then the indicia plate 47 is secured tightly in position by screw 48. The knob 101 is then suitably secured to the bushing 100 in a position in which its pointer registers with No. 1 of the indicia on plate 47. Due to the various characteristics of the refrigerating systems and the variation in insulation of the cabinets, it may be desirable to adjust the switch because the proper temperature cannot be obtained throughout the range of adjustment of the knob 101. In that case the knob 101, the plate 47, the bushing 100, the disks 103 and 105 and the plate 107 are removed and the tension of the spring is readjusted by turning the knurl 99. These parts are then reassembled as previously described.

A manual starting and stopping switch and an overload circuit breaker are also incorporated in this switch and will now be described, reference being made particularly to Figs. 9, 10 and 11 of the drawings. The circuit to the motor passes through contacts 116 and 117 which are spaced from one another and arranged to be bridged by contact 118 of a snap acting switch. The snap acting switch comprises a lever 119 which is channel shaped and is pivoted to a pin 120 carried by the bracket 59. The right end of the lever 119, as viewed in Fig. 9, carries a fulcrum pin 122 which is connected to a push and pull arm 123 having a handle 124 for manipulating the same. This arm 123 is arranged to raise and lower the lever 119. The opposite end of the lever 119 carries a fulcrum pin 125 to which is pivotally mounted a lever 126. The left hand end of the lever 126 carries an insulating block 127 which in turn loosely carries the movable contact 118. The fulcrum pin 122 for arm 123 pivotally carries a lever 128 having an upright ear 129 to which there is attached a spring 130. The opposite end of the spring 130 is connected to the left hand end of lever 126. By forcing downwardly on the arm 123 by the knob 124, the fulcrum pin 122 will be moved downwardly and the lever 119 is moved in a clockwise direction about pivot 120 causing the left hand end of lever 126 to be moved upwardly. The right hand end of the lever 126 at this time being restrained from upward movement by a stop 130. When the levers 119 and 126 are moved beyond their dead center position with respect to the coil spring 130, the coil spring 130 will quickly move the outer end of lever 126 downwardly to cause a quick engagement of contact 118 with contacts 116 and 117. By pulling upwardly on the knob 124, the fulcrum pin 122 will be moved upwardly and the lever 119 will be moved in a counterclockwise direction forcing the right hand end of lever 126 downwardly and, when the levers 119 and 126 are moved beyond a dead center position with respect to the coil spring 130, the coil spring will quickly move the left end of the lever 126 upwardly to quickly separate contact 118 from contacts 116 and 117.

The circuit from the motor passes through a heating coil 135 (see Fig. 14) which is disposed in a housing 136 formed in the underside of frame 49. A metal screw 137 is threaded through the top wall of the housing 136 and into the heating coil 135. A ratchet 138 (see Fig. 9) has its stem extending into and soldered to this screw 137. A plate 140 is disposed between the top side of the frame 49 and below the snap acting manually operated switch. This plate 140 includes an arm 141 of resilient material having at its outer end a hook 142 which is arranged to engage with a tooth of the ratchet 138. A spring 143 has one end thereof connected with the bracket 59 and the other end to an upwardly extending arm 145 on the plate 140. The spring 143 normally tends to move the plate 140 to the left as viewed in Fig. 5 but is normally restrained from this movement by the hook 142 engaging a tooth in the ratchet 138. If however the solder connection between the stem of ratchet 138 and the screw 137 is melted sufficiently to permit the rotation of ratchet 138, the spring 143 will move the plate 140 to the left. The plate 140 is provided with an upwardly extending ear 146 which is arranged to engage a downwardly extending ear 147 formed on the lever 119 to the right of the pivot point 120 as viewed in Fig. 9. Therefore when the plate 140 is moved by the spring 143, the ear 146 on the plate 140 will engage the ear 147 on the lever 119 and rotate the lever 119 in a counterclockwise direction which in turn will cause a separation of contact 118 from contacts 116 and 117 as above described. Should the motor require an excessive amount of current for a predetermined length of time as for example, should the motor stall, the current flowing in coil 135 will heat the screw 137 sufficiently to cause melting of the solder between it and the stem of ratchet 138 whereby to release the plate 140 to the action of the spring 143 to break the circuit of the motor by separating contact 118 from 116 and 117. By again pushing inwardly on the arm 123 by a knob 124 the switch can be reset after the solder has rehardened but this should not be done until the defect has been remedied.

From the foregoing it can be seen that there is provided a switch which provides for manually starting and stopping the refrigerating apparatus and for controlling the temperature of the evaporator so as to maintain the food compartment between predetermined high and low temperature limits. The temperature regulator is readily accessible which permits a temperature adjustment within certain limits but cannot be moved to such an extent as to disturb the economical factory adjustment. The contacts of the temperature regulator and the manually controlled switch and the overload circuit breaker heater coil 135 are all connected in series relation and therefore only one circuit passes through the entire switch.

In order to temporarily obtain a higher than normal temperature of the evaporator as for example for the purpose of permitting the frost on the evaporator to melt and in order to obtain temporarily a lower than normal temperature for quick freezing or congealing a substance within the trays 26, there is incorporated in the switch 41, mechanism which is manually operable for obtaining either this higher or lower temperature and which mechanism automatically restores the system to the normal control after completion of the temporary phase of operation. A shaft 150 is journalled in opposite sides of the frame 45 to which there is fastened an operating member 151 having an operating knob 152. This knob extends through an opening 153 in the indicia plate 47 and is used for oscillating the shaft 150. A cam 155 is secured to the shaft 150 and disposed on one side of the member 151. This cam is provided with lugs 156 and 157 spaced from one another. The upwardly extending ear 67 of lever 61 forms an arm 158 and has its extreme end extending between the lugs 156 and 157. These lugs are spaced such a distance from one another that the arm 158 will engage neither when the shaft 150 and cam 155 are in the neutral or normal position shown in Fig. 4. If the knob 152 is moved to its extreme right hand position as viewed in Fig. 4 and as shown in Fig. 8, the lug 157 will engage the underside of arm 158 and will cause the lever 161 to be raised upwardly and in case the snap switch is not closed, it will raise the lever 61 to close the snap switch and thereby complete the circuit to the motor through contacts 50, 75 and 51, or if the knob 151 is moved to its extreme left hand position, the lug 156 will engage the upper side of arm 158 and force the lever 61 downwardly and if the switch is not open it will move the lever 61 far enough to open the circuit by separating contact 75 from 50 and 51. On the opposite side of member 151 there is provided a second cam 160 which is also secured to the shaft 150. This cam is provided with a nose 161 and a nose 162 which cooperate respectively with the ends of leaf springs 163 and 164. Leaf springs 163 and 164 are attached to the casing 45 by screw 166 and bolt 167. These springs are normally urged toward one another and the tension of spring 163 is adjusted by a screw 169 and the tension of spring 164 is adjusted by a screw 170. These screws are threaded into a plate 171 which is connected to the frame 45 by screw 166 and bolt 167. In Fig. 7 the mechanism is shown in its neutral position. If the knob 152 is moved to its extreme right hand position, the nose 162 will be moved to its dotted line position in Fig. 7 and in order to return the cam 160 to its neutral position, the nose 162 must ride over the nose of the spring 164 and overcome the resistance of the spring. If the knob 152 is moved to its extreme left hand position, the nose 161 will be moved to the opposite side of the nose on the spring 163 and in order to return the cam 160 to its neutral position the nose 161 must ride over the end of the nose of the spring 163 and thereby overcome the resistance offered by this spring.

In order to obtain an abnormally low temperature of the evaporator the knob 152 is swung to the position shown in Fig. 8. This will cause the closing of contact 75 with contacts 50 and 51 and will cause the nose 162 of cam 160 to be moved to its dotted line position in Fig. 7. The spring 164 at this time will resist the counterclockwise movement of the cam 160 because it is necessary for the nose 162 to ride over the nose of the spring 164 and therefore the downward movement of the arm 158 and the lever 61 is resisted. Consequently a low pressure must be obtained in the bellows before the lever 61 is moved beyond the dead center position of snap acting levers 70 and 71. In other words at this time the spring 164 counteracts the tension of spring 65. Since a low pressure is necessary in bellows 54 in order to open the switch, a low temperature must be attained at the evaporator. At this time the cam 155 will be rotated to its neutral position as shown in full lines in Fig. 7 in which position, due to the spacing of lugs 156 and 157, the spring 164 is no longer effective. Therefore at the completion of the temporary phase of the lower than normal temperature operation the snap switch will no longer be affected by spring 164 and will maintain the refrigerating system at its normal operating temperature.

When the knob 152 is moved to its extreme left hand position the lug 156 will move the arm 158 and lever 61 downwardly and in case the snap switch is not open, will separate contact 75 from contacts 50 and 51, and also will cause nose 161 to slide underneath the nose of spring 163 whereby the spring 163 will resist clockwise movement of the cam 160. At this time, the arm 158 and lever 61 are resisted in their upward movement by the effect of spring 163 since the spring 163 resists the clockwise movement of nose 161. In other words the spring 163 augments the effect of spring 65 and consequently a high pressure must be maintained in the bellows 55 before the lever moves the snap acting levers 70 and 71 beyond their dead center position. Since a high pressure is necessary in bellows 155 it follows that a high temperature must be attained at the evaporator and the adjustment of the tension of spring 163 by screw 169 is such that the temperature of ahe evaporator is raised beyond the melting point of the frost thereon so that the frost is melted before the snap switch operates to reclose contact 75 with contacts 50 and 51. When the snap switch moves to reclose the contacts the nose 161 of cam 160 will have moved to its neutral position in which position the arm 158 will not engage either of lugs 156 or 157 in its normal operation. Thus it will be seen that at the completion of the temporary phase of higher than normal temperature, the restored spring 163 will no longer be effective to augment the tension of spring 65 and the system will be under the control of the spring 65 and will resume its normal operation.

Means are provided for compensating the resilient effect of springs 164 in accordance with the adjustment of the tension of spring 65 and in this means comprises the cam 110 (see Figs. 7 and 12) which is in engagement with the end of plate 171 which carries the adjusting screws 169 and 170. Cam 110 is actuated with the shank 98 of screw 94 by the knob 101. If the knob 101 is rotated in a clockwise direction to decrease the tension of spring 65, the resilient plate 171 is forced downwardly by the cam 110 causing the screw 169 to increase the tension of spring 163 and cause the screw 170 to decrease the tension of spring 164. In this manner the differential between spring 164 and spring 65 is maintained constant and the differential between spring 163 and spring 65 is maintained constant, regardless of the position of the knob 101. In other words if the knob is moved from the No. 1 position to the No. 6 position for example, which in effect causes a decrease in the tension of spring 65 and which will allow the switch to close at a lower pressure, concurrently the tension of spring 163 is increased sufficiently to compensate for the decrease in the tension of spring 65 whereby the effective resistance of these springs 65 and 163 is maintained constant and therefore the pressure in the bellows 54 must be raised to a given temperature at all times when knob 152 is in defrosting position, to overcome the effective resistances of springs 65 and 163 regardless of the position of the knob 101; likewise movement of knob 101 from its No. 1 position to its No. 6 position, causes a decrease in the tension of spring 164 to compensate for the decrease in tension of spring 65 whereby the effective resistance of these springs 65 and 164 is maintained constant. The effect of the compensator is to insure a temperature of the evaporator above the melting point of the frost thereon when the knob 152 is moved to its defrosting position although the temperature controlling knob 101 is in its coldest temperature position, No. 12. The same is true with regard to the quick freezing position. Although the temperature controlling knob 101 is in its extreme warmest position the effective resistance of the combined action of springs 164 and 65 assures the same lower than normal temperature as when the knob is in its No. 12 or coldest position.

According to the embodiment of the invention just described the mechanism was constructed so that one knob only was necessary for moving the mechanism to either of its lower or higher than normal control positions. In accordance with the modification shown in Figs. 14, 15, 16 and 17 separate knobs are provided. It will be recalled that upward movement of the lever 61 causes the closing of the automatic switch and downward movement of the lever 61 causes the opening of the automatic switch. The spring 263 shown in Fig. 14 and the spring 264 shown in Fig. 15 have the same effects as springs 163 and 164 shown in the Fig. 7. The knob 172 in Fig. 14 is in its ineffective position and to become effective it must be moved to the left. This knob is formed integral with a segment 173 and this segment is carried for oscillation on a shaft 181. The segment 173 is provided with a groove 174 for receiving an arm 258 of the lever 61. The segment 173 is notched at 175 to receive the end of a screw 176. The spring 263 is interposed between a nut 177 and a stationary abutment 178 carried by the frame 45. As shown in Fig. 14 the spring urges the screw 176 to the right causing the shoulder 179 of the segment to be held against an abutment 180 on the casing 45. When the knob 172 is moved to the left, it causes counterclockwise rotation of segment 173 whereby the point of the screw 176 will be moved below its dead center position with respect to the axis of the segment and the left hand end of the screw. This will cause the shoulder 182 of the segment to engage an ear 183 of the arm 258 causing the arm 258 and the lever 61 to be moved downwardly and if the switch is not open will cause the lever 61 to move downwardly far enough to open the switch. In that position the spring 268 will resist the upward movement of arm 258 and lever 61 and consequently will increase the resistance to the expansion of bellows 55 whereby a high temperature must be attained at the evaporator before the pressure in the bellows is sufficient to overcome the resistance of springs 65 and 263. During the upward movement of the arm 258 the right hand end of screw 176 will moved above its dead center position and will hold the shoulder 179 of segment 173 against abutment 180 and hold the shoulder 182 out of range of movement of the arm 258. Therefore after the temporary phase of abnormal high temperature the system is restored to the normal control of the spring 65.

The action of spring 264 is the reverse of spring 263. In Fig. 15 the switch is shown as being under normal control. A knob 185 projects through the plate 47 and is formed integral with a segment 186 carried by the shaft 181. Segment 186 is provided with a groove 189 for the free movement of arm 258. Segment 186 is formed with a notch 190 similar to the notch 175 in segment 173 and receives the point of a screw 191. This screw carries a nut 193 and the spring 264 is interposed between the nut 193 and a stationary abutment 194 carried by the frame 45. During normal operation of a refrigerating system the mechanism is maintained in the position shown in Fig. 15 in which the spring 264 tends to rotate the segment 186 in a clockwise direction whereby the shoulder 196 thereof is held against an abutment 197 of the frame 45. When it is desirable to obtain temporarily a lower than normal temperature of the evaporator, the knob 185 is swung to the left whereby the point of the screw 191 is moved above its dead center position with respect to the shaft 187 and the right hand end of the screw so as to force the shoulder 198 of the segment 186 against an abutment 199 formed on the frame 45. In this position the spring 264 resists the clockwise movement of the segment 186. In moving the knob 185 to its quick freezing position, the shoulder 201 thereof will engage an ear 202 on the arm 258 causing the arm 258 and lever 61 to be raised and if the switch is not already closed, will cause the closing of the switch.

When the knob 185 is in its extreme left hand or quick freezing position, the spring 264 will resist the downward movement of the arm 258 and lever 61 which in effect will require a low pressure in bellows 55 before the spring 65 moves the lever 61 downwardly far enough to open the switch. In order to obtain this low pressure in the bellows 55 the temperature in the evaporator must be lowered below its normal temperature which is a quick freezing temperature. When the spring 65 overcomes the effect of the bellows 55 and the spring 264, the switch contacts are open and the point of screw 191 will be moved to below its dead center position whereby it will tend to hold the segment 186 in the position shown in the drawings in which position the ear 202 may freely oscillate in the groove 189. Therefore after the temporary phase of quick freezing, the system is restored to the normal control through the spring 65.

Referring particularly to Fig. 17 it will be noted that the segments 173 and 186 are interlocked. Segment 173 is formed with a projection 204 and the segment 186 is formed with a projection 205. The projections extend toward one another and are arranged to be engaged by one another. If for example the segment 173 is in its defrosting position and it is desirable to operate the system for quick freezing, it is necessary only to move knob 185 to its quick freezing position. When the segment 173 is in its defrosting position it is engageable by the projection 205 of the segment 186 so that when the segment 186 is moved to its quick freezing position the projection 205 will engage projection 204 and cause the segment 173 to be restored to the position shown in Fig. 14. Likewise if the segment 186 is in its quick freezing position and it is desirable to defrost the evaporator, it is necessary only to move the knob 172 and this movement will cause the projection 204 to engage projection 205 on segment 186 and restore the segment 186 to the position shown in Fig. 15.

From the foregoing it will be apparent that there has been provided a refrigerating system in which normally a desired temperature is maintained for proper food preservation. In case it is desirable to hasten the freezing by the evaporator or to defrost the evaporator, it is necessary only to manually cause the starting of this temporary phase of operation and after the temporary phase of operation the system is automatically restored to the normal control.

While the forms of embodiment of the present invention as herein disclosed constitute preferred forms, it is to be understood that other forms might be adopted, all coming within the scope of the claims which follow.

I claim:

1. In a refrigerating system comprising a cooling unit, means for circulating refrigerating medium through said unit, control means for controlling the system for maintaining the cooling unit between predetermined limits of temperature, control means for the system for temporarily obtaining a higher temperature in the cooling unit including mechanism for temporarily modifying the operation of the circulating means and for thereafter automatically restoring the system to the normal control of the first mentioned control means, manipulating means for rendering the second named control means effective, control means for the system for temporarily obtaining a lower temperature in the cooling unit including mechanism for temporarily modifying the operation of the circulating means and for thereafter automatically restoring the system to the normal control of the first mentioned control means, and manipulating means for rendering the last named control means effective.

2. In a refrigerating system comprising a cooling unit, means for circulating refrigerating medium through said unit, control means for controlling the system for maintaining the cooling unit between predetermined limits of temperature, control means for the system for temporarily obtaining either a higher or a lower temperature in the cooling unit including mechanism for temporarily modifying the operation of the circulating means and for thereafter automatically restoring the system to the normal control of the first mentioned control means, a manipulating means for rendering the control means effective for obtaining said higher temperature in the cooling unit, and a manipulating means for rendering the control means effective for obtaining said lower temperature in the cooling unit.

3. In a refrigerating system comprising a cooling unit, means for causing refrigerating medium to flow through said unit for maintaining said unit normally between predetermined temperature limits; and control means for the system for temporarily rendering the first means ineffective for the purpose of maintaining said unit normally between said predetermined temperature limits, said control means including mechanism responsive to a predetermined higher than normal temperature for restoring said system to the normal control of said first mentioned means and including mechanism responsive to a predetermined lower than normal temperature for restoring said system to the normal control of said first mentioned means, and a plurality of manipulating means for selectively rendering either of said mechanism operative.

4. In a refrigerating system comprising a cooling unit, means for circulating refrigerating medium through said unit, control means for controlling the system for maintaining the cooling unit between predetermined limits of temperature, control means for the system for temporarily obtaining either a higher or a lower temperature in the cooling unit including mechanism for temporarily modifying the operation of the circulating means and for thereafter automatically restoring the system to the normal control of the first mentioned control means, a manipulating means for rendering the control means effective for obtaining said higher temperature in the cooling unit, a manipulating means for rendering the control means effective for obtaining said lower temperature in the cooling unit, and an interlock between said first and second mentioned manipulating means.

5. In a refrigerating system comprising a cooling unit, means for circulating refrigerating medium through said unit, control means for controlling the system for maintaining the cooling unit between predetermined limits of temperature, control means for the system for temporarily obtaining either a higher or a lower temperature in the cooling unit including mechanism for temporarily modifying the operation of the circulating means and for thereafter automatically restoring the system to the normal control of the first mentioned control means, a manipulating means for rendering the control means effective for obtaining said higher temperature in the cooling unit, a manipulating means for rendering the control means effective for obtaining said lower temperature in the cooling unit, and an interlock between said first and second mentioned manipulating means, said interlock including a lost motion connection.

EDWARD HEITMAN.